(12) United States Patent
Greggs

(10) Patent No.: US 8,910,987 B1
(45) Date of Patent: Dec. 16, 2014

(54) VEHICLE BODY TRIM STRUCTURE

(71) Applicant: Nissan North America, Inc., Franklin, TN (US)

(72) Inventor: Alan Greggs, Commerce Township, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/057,583

(22) Filed: Oct. 18, 2013

(51) Int. Cl.
*B60R 13/04* (2006.01)
*B62D 25/04* (2006.01)

(52) U.S. Cl.
CPC ................ *B60R 13/04* (2013.01); *B62D 25/04* (2013.01)
USPC ...................................................... 296/1.08

(58) Field of Classification Search
CPC .... B60R 13/02; B60R 13/0237; B60R 13/025
USPC .................. 296/1.08; 52/716.1, 716.5, 716.6, 52/716.7; 24/289–297; 428/31
See application file for complete search history.

(56) References Cited

U.S. PATENT DOCUMENTS

| | | | |
|---|---|---|---|
| 2,741,324 A | 4/1956 | Anderson | |
| 3,188,730 A * | 6/1965 | Meyer | 29/430 |
| 3,769,662 A * | 11/1973 | Meyer | 24/297 |
| 3,841,682 A * | 10/1974 | Church et al. | 293/142 |
| 3,895,468 A * | 7/1975 | Bernstein | 52/222 |
| 3,897,967 A * | 8/1975 | Barenyi | 293/120 |
| 4,363,839 A * | 12/1982 | Watanabe et al. | 428/31 |
| 4,364,591 A * | 12/1982 | Bien | 293/102 |
| 4,529,244 A | 7/1985 | Zaydel | |
| 4,699,420 A * | 10/1987 | Priest et al. | 296/210 |
| 4,707,020 A | 11/1987 | Enokida et al. | |
| 4,863,211 A * | 9/1989 | Eash | 296/1.08 |
| 4,886,312 A | 12/1989 | Asoh | |
| 5,092,078 A | 3/1992 | Keys | |
| 5,320,151 A * | 6/1994 | Wumer | 144/348 |

(Continued)

FOREIGN PATENT DOCUMENTS

| | | |
|---|---|---|
| DE | 3539177 A1 | 5/1987 |
| EP | 2085623 A1 | 8/2009 |

(Continued)

OTHER PUBLICATIONS

2013 Vauxhall Adam (British Car).

(Continued)

*Primary Examiner* — H Gutman
(74) *Attorney, Agent, or Firm* — Global IP Counselors, LLP

(57) ABSTRACT

A rear body panel has a pillar portion extending upward from a vehicle body waistline defined along the rear body panel. An outboard facing surface of the pillar portion has a front peripheral edge section at least partially defining a side opening. A rearward facing surface of the pillar portion has an inboard peripheral edge section partially defining a rear window opening. The rear window glass is installed within the rear window opening overlaying at least a portion of the inboard peripheral edge. A first section of the exterior trim panel extends rearward from the front peripheral edge section along the outboard facing surface at the vehicle body waistline. A second section extends in a lateral inboard direction from a rearward end of the first section to the inboard peripheral edge section along the rearward facing surface to the rear window opening at the vehicle body waistline.

22 Claims, 14 Drawing Sheets

(56) References Cited

U.S. PATENT DOCUMENTS

| | | | |
|---|---|---|---|
| 5,356,195 A | 10/1994 | Kanda | |
| 5,360,253 A | 11/1994 | Sasaki et al. | |
| 6,416,113 B1 | 7/2002 | Page | |
| 6,612,642 B2 | 9/2003 | Kasahara | |
| 7,220,032 B2 | 5/2007 | Mori | |
| 7,490,891 B2 | 2/2009 | Terakawa et al. | |
| 7,980,613 B2 * | 7/2011 | Murray et al. | 296/1.08 |
| 8,083,285 B2 | 12/2011 | Yanagida et al. | |
| 8,419,099 B2 * | 4/2013 | Inoue et al. | 296/1.08 |
| 2003/0070390 A1 * | 4/2003 | Dunn | 52/716.7 |
| 2013/0020822 A1 | 1/2013 | Inoue et al. | |

FOREIGN PATENT DOCUMENTS

| | | |
|---|---|---|
| JP | 57-087768 A | 6/1982 |
| JP | 60-078875 A | 5/1985 |
| JP | 64-018785 A | 1/1989 |
| JP | 08-276871 A | 10/1996 |
| JP | 10-167126 A | 6/1998 |
| JP | 2006-117072 A | 5/2006 |
| JP | 2008-062810 A | 3/2008 |
| JP | 2012-250587 A | 12/2012 |

OTHER PUBLICATIONS

2011 Odyssey, Exterior Trim Component Location Index excerpt, 2011 Honda Odyssey Service Manual.

2011 Odyssey, Tailgate Spoiler Trim Replacement excerpt, 2011 Honda Odyssey Service Manual.

* cited by examiner

VEHICLE BODY TRIM STRUCTURE

BACKGROUND

1. Field of the Invention

The present invention generally relates to a vehicle body structure. More specifically, the present invention relates to a vehicle body structure having an exterior trim panel installed along a rear pillar portion that extends along a vehicle body waistline of the vehicle body structure.

2. Background Information

Exterior trim panels are often provided on exterior surfaces of a vehicle to enhance its overall appearance.

SUMMARY

One object of the present disclosure is to provide a vehicle body structure with a trim panel that provides a roof structure of the vehicle body structure with a floating appearance.

Another object of the present disclosure is to provide a vehicle body structure with a trim panel installed to a rear pillar structure with the trim panel extending from a rear side window along a vehicle body waistline to a rear window on the back side of the vehicle body structure providing a roof structure with a floating appearance.

In view of the state of the known technology, one aspect of the disclosure includes a vehicle body structure having a rear body structure, a rear window glass and an exterior trim panel. The rear body panel has a pillar portion extending upward from a vehicle body waistline defined along the rear body panel. The pillar portion includes an outboard facing surface and a rearward facing surface. The outboard facing surface has a front peripheral edge section at least partially defining a side opening. The rearward facing surface has an inboard peripheral edge section at least partially defining a rear window opening. The rear window glass is installed within the rear window opening overlaying at least a portion of the inboard peripheral edge. The exterior trim panel has a first section extending rearward from the front peripheral edge section along the outboard facing surface at the vehicle body waistline and a second section that extends in a lateral inboard direction from a rearward end of the first section to the inboard peripheral edge section along the rearward facing surface to the rear window opening at the vehicle body waistline.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
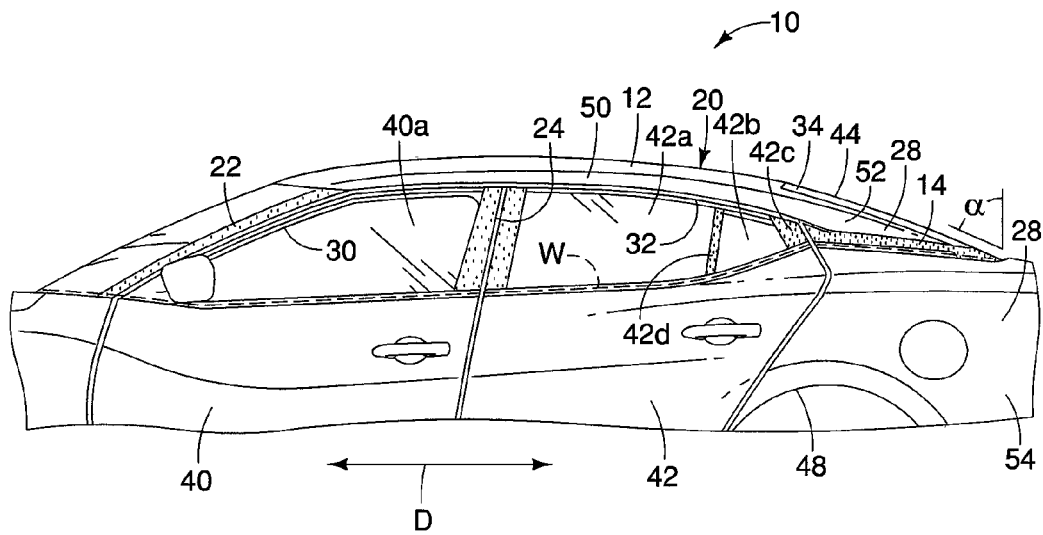
FIG. 1 is a side view of a vehicle that includes a vehicle body structure with a rear pillar portion having an exterior trim panel that extends along the rear pillar portion from a rear side window to a rear window in accordance with a first embodiment.
Figure 2:
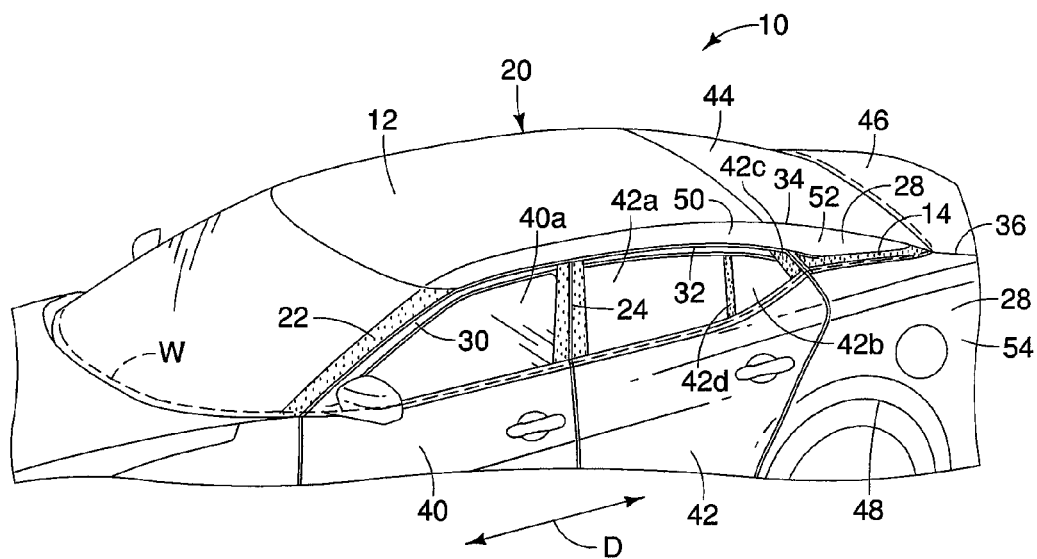
FIG. 2 is a perspective view of the vehicle depicted in FIG. 1, showing the exterior trim panel in accordance with the first embodiment.
Figure 3:
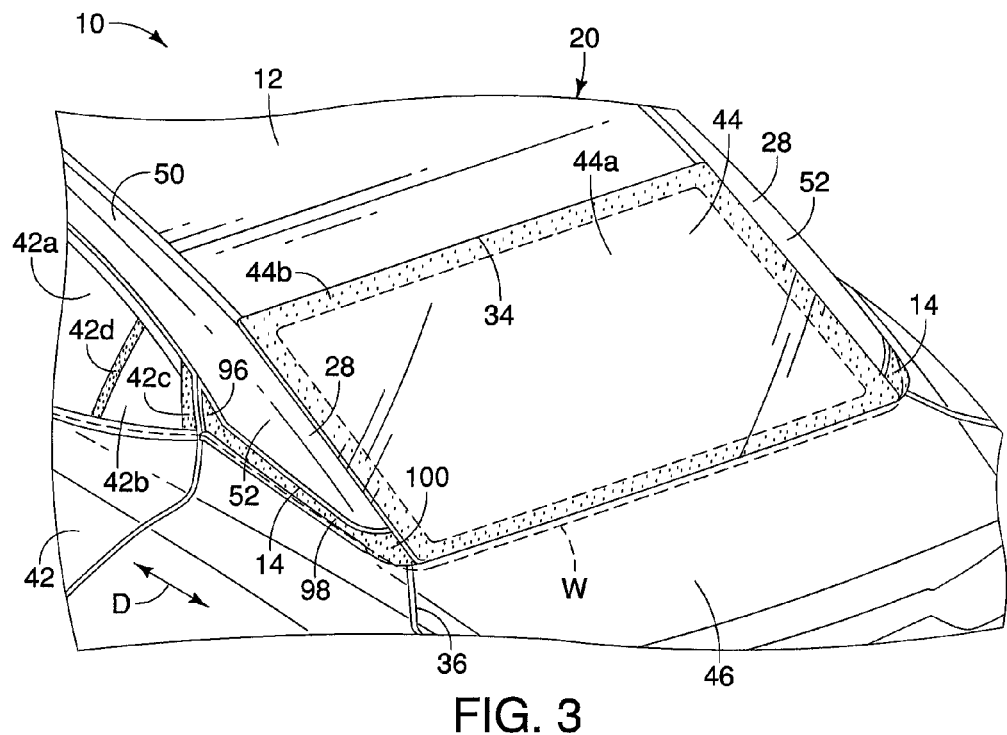
FIG. 3 is a perspective view of a rear portion of the vehicle depicted in FIG. 1, showing the exterior trim panel extending to the rear window in accordance with the first embodiment.

Referring initially to FIG. 1, a vehicle 10 is illustrated in accordance with a first embodiment. The vehicle 10 includes a roof structure 12 with floating appearance (a floating roof design) that is in part due to exterior trim panels 14. The exterior trim panels 14 are a dark color, for example, black, giving the effect of having a floating roof, as described in greater detail below.

Figure 6:
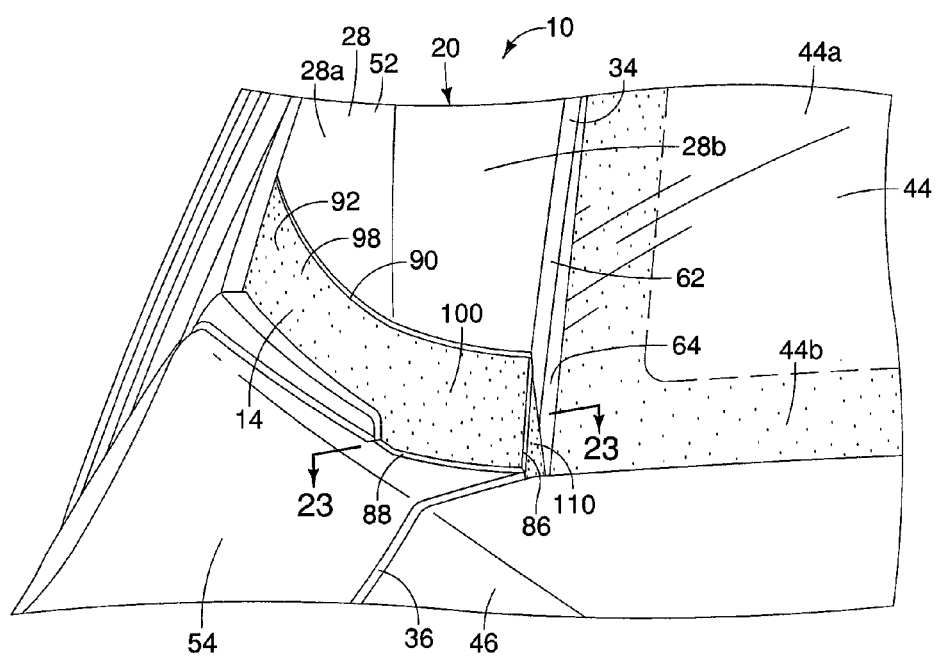
FIG. 6 is a rear view of a rear portion of the vehicle showing the exterior trim panel extending to the rear window in accordance with the first embodiment.
Figure 7:
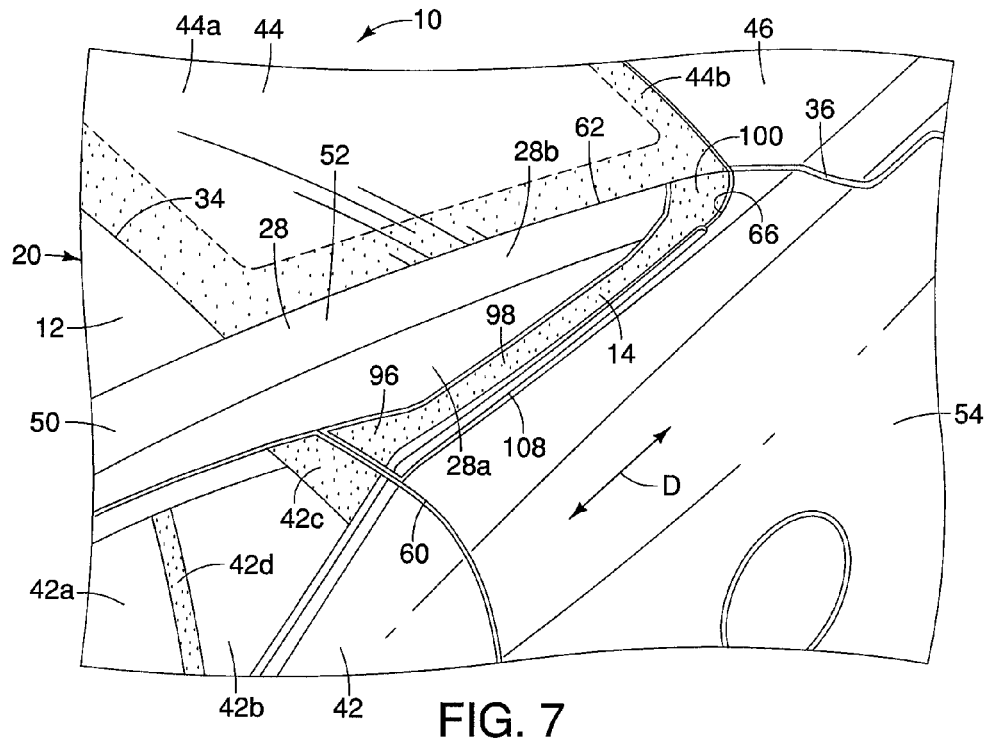
FIG. 7 is another perspective view of the side portion of the vehicle showing the exterior trim panel extending from the rear door jamb to the rear window in accordance with the first embodiment.
Figure 8:
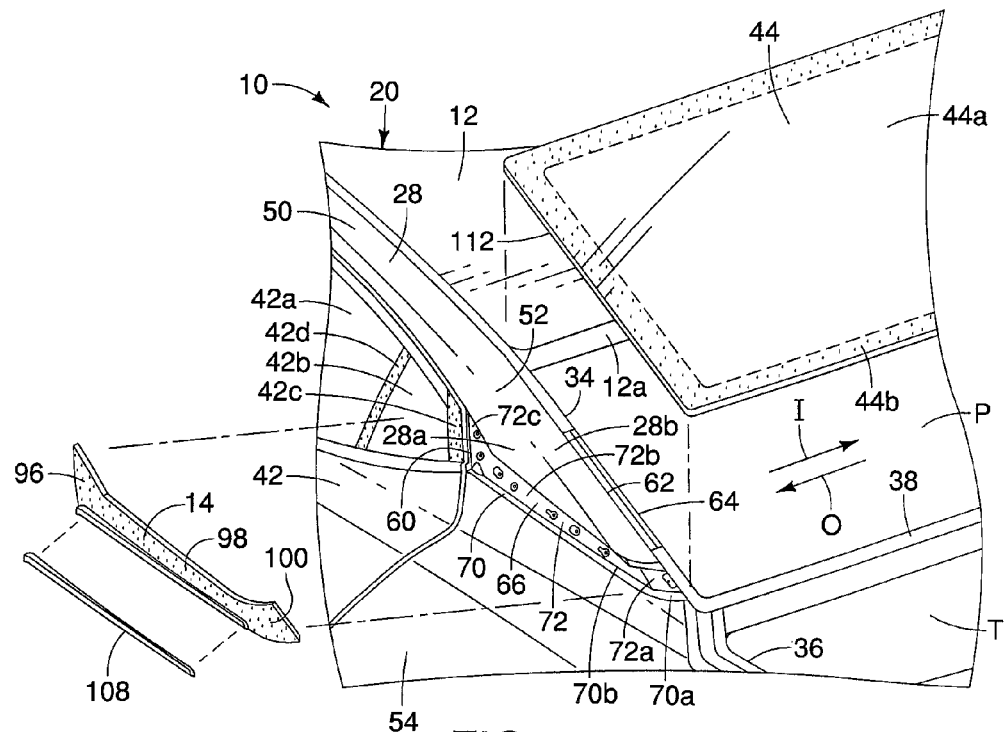
FIG. 8 is an exploded perspective view of the side portion of the vehicle showing the exterior trim panel removed revealing a recess formed in the rear pillar portion of the vehicle body structure in accordance with the first embodiment.

First, a brief description of various features of the vehicle 10 is provided below with specific reference to FIG. 1-12. The vehicle 10 has a vehicle body structure 20 that includes, among other things, an A-pillar 22, a B-pillar 24, a rear body panel 28 and the roof structure 12. A front door opening 30 is partially defined by the A-pillar 22, the B-pillar 24 and a portion of the roof structure 12, in a conventional manner. A rear door opening 32 (a side opening) is partially defined by the B-pillar 24, another portion of the roof structure 12 and the rear body panel 28. Further, a rear window opening 34 is partially defined by the rear body panel 28 and a rear portion of the roof structure 12. A trunk opening 36 is partially defined by the rear body panel 28 and by a lower window support member 38 (FIG. 8), at a lower area of the rear window opening 34. In FIG. 8, a trunk lid 46 has been removed to show the trunk opening 36 and the lower window support member 38. Beneath the window opening 34, within the passenger compartment of the vehicle 10, a rear parcel shelf P is visible. The rear parcel shelf P extends from the back of a rear seat (not shown) to the lower window support member 38. The rear parcel shelf P serves to separate the passenger compartment of the vehicle 10 from the trunk area T of the vehicle 10.

There are two rear body panels 28 and two exterior trim panels 14, one on each side of the vehicle 10 with the lower window support member 38 extending therebetween at a lower edge of the rear window opening 34 (see FIG. 8). The rear body panels 28 are identical to one another except that they are symmetrical mirror images of one another. Similarly, the exterior trim panels 14 are identical to one another except that they are symmetrical mirror images of one another. Therefore only one of the rear body panels 28 and one of the exterior trim panels 14 are described hereinbelow for the sake of brevity, since description of one equally applies to the other.

A front door 40 is installed to the A-pillar 22 for pivoting movement between a closed position (shown in FIGS. 1 and 2) and an open position (not shown) in a conventional manner. In the closed position, the front door 40 covers the front door opening 30. A rear door 42 is installed to the B-pillar 24 for pivoting movement between a closed position (shown in FIGS. 1 and 2) and an open position (not shown). In the closed position, the rear door 42 covers the rear door opening 32 in a conventional manner.

The front door 40 includes a window opening with a forward side window 40a moveably installed thereto in a conventional manner. The rear door 42 similarly includes a window opening with a first rearward side window 42a, a second rearward side window 42b, a divider 42d between the first rearward side window 42a and the second rearward side window 42b, and a non-transparent panel 42c at the rearward end of the rear window opening 34. A rear window glass 44 is fixedly installed to the vehicle body structure 20 covering the rear window opening 34. A trunk lid 46 is pivotally coupled to the vehicle body structure 20 in a convention manner for movement between a closed position (shown in FIGS. 2-6) and an open position (not shown).

The forward side window 40a, the first rearward side window 42a, the second rearward side window 42b, the non-transparent section 42c, and the rear window glass 44 have respective lower edges that together define respective portions of a vehicle body waistline W. The vehicle body waistline W is a conventional automotive expression that is defined as an imaginary line around a car or other vehicle at the level of the bottom of the windows. The vehicle body waistline W is depicted in several of the figures with a dashed line.

The A-pillars 22 are provided with a dark or black appearance on an exterior surface thereof. For example, a trim panel can be fitted on to each of the A-pillars 22 and can include a black paint or black finish. Alternatively, the A-pillar 22 can be assembled with an outer panel that is made of a black material.

Similarly, the front door 40 includes a rear trim panel that covers the B-pillar 24 in the closed position and the rear door 42 includes a front trim panel that also covers the B-pillar 24. The rear trim panel of the front door 40 and the front trim panel of the rear door 42 are dark in color or are black. These panels can be made of a black material or can be painted black to achieve the floating roof effect.

The rear body panel 28 is now described in greater detail with specific reference to FIGS. 2, 3 and 5-11. The rear body panel 28 is a contoured element of the vehicle body structure 20 that can be manufactured as a single element, or can be made of several different panels welded or otherwise rigidly fixed to one another. In the depicted embodiment, the rear body panel 28 is a single piece that includes a roof rail portion 50, a pillar portion 52 and a fender portion 54. The roof rail portion 50 extends along the side of the roof structure 12 above the front door opening 30 and above the rear door opening 32. The roof rail portion 50 can be part of the roof structure 12, or can be a panel that covers a roof rail (not shown) of the roof structure 12.

The pillar portion 52 extends downward and rearward from the roof rail portion 50 between the rear door opening 32 and the rear window opening 34. The fender portion 54 extends downward from the pillar portion 52 and defines a rear section of the vehicle 10, including a wheel well 48 (shown in FIGS.

1 and 2). The pillar portion 52 of the rear body panel 28 covers and/or forms part of a C-pillar structure (not shown) of the vehicle 10.

The vehicle body waistline W basically defines an approximate boundary between the pillar portion 52 and the fender portion 54, as is clear from the description hereinbelow. The rear body panel 28 has an outboard surface 28a (FIGS. 1-9), a rearward facing surface 28b and an inboard surface 28c (shown only in FIG. 10).

The pillar portion 52 includes the following: a forward peripheral end 58 that defines a door jamb 60 of the rear door opening 32 (FIGS. 7, 9, 10 and 11); a rearward peripheral end 62 adjacent to the rearward facing surface 28b that includes a rear window supporting flange 64 (FIGS. 4, 8, 9 and 23); and a recess 66 that extends from the forward peripheral end 58 to the rearward peripheral end 62 of the pillar portion 52. The door jamb 60 basically defines a front peripheral edge section of the rear body panel 28.

The pillar portion 52 has a contoured surface that includes compound curves. In the depicted vehicle body structure 20, there is no clear dividing line between the roof rail portion 50 and the pillar portion 52. Rather, the roof rail portion 50 and the pillar portion 52 have the appearance of being one single contoured element. However, it should be understood from the drawings and the description herein that the roof rail portion 50 and the pillar portion 52 can be altered such that there is a clear distinction between the two portions of the rear body panel 28.

Figure 5:
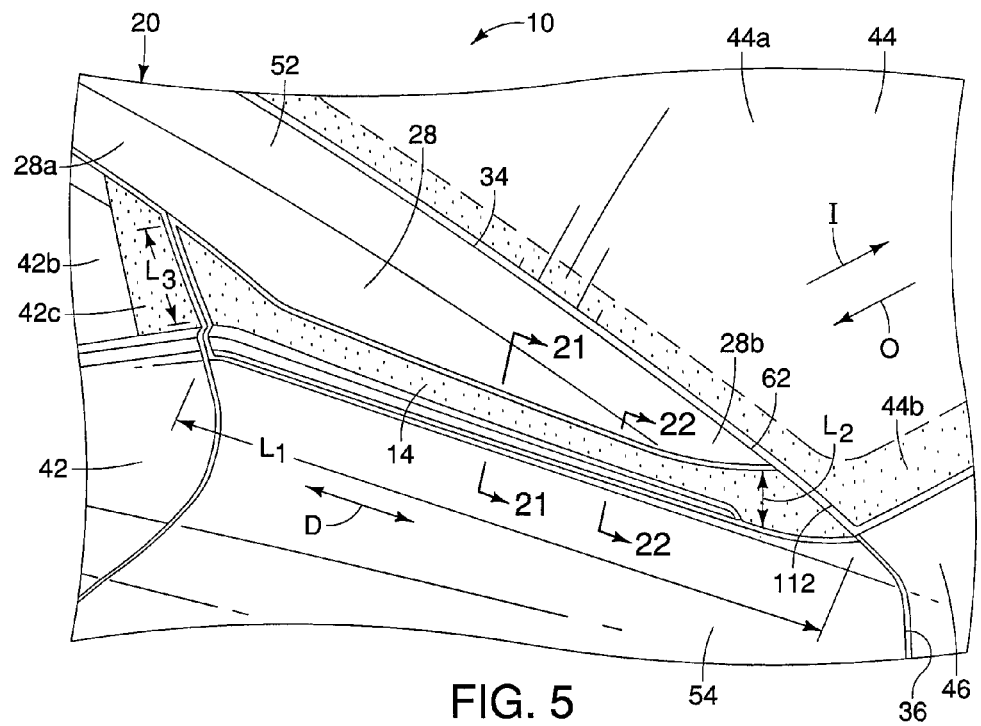
FIG. 5 is a perspective view of a side portion of the vehicle depicted in FIG. 1, showing the exterior trim panel extending from the rear door jamb to the rear window in accordance with the first embodiment.

The pillar portion 52 curves downward and rearward from a point above the rear door opening 32 moving down toward the vehicle body waistline W. The outboard surface 28a of the rear body panel 28 is therefore not a flat surface in the depicted embodiment. Further, as shown in FIG. 5-7, the pillar portion 52 of the rear body panel 28 has a curve extending inboard toward the rear window opening 34 thereby defining the rearward facing surface 28b. As indicated in FIG. 8, the lower window support member 38 extends along the lower edge of the rear window opening 34 and is rigidly attached to the pillar portion 52. However, it should be understood that at least a portion of the lower window support member 38 can be integrally formed with the pillar portion 52 of the rear body panel 28.

Figure 9:
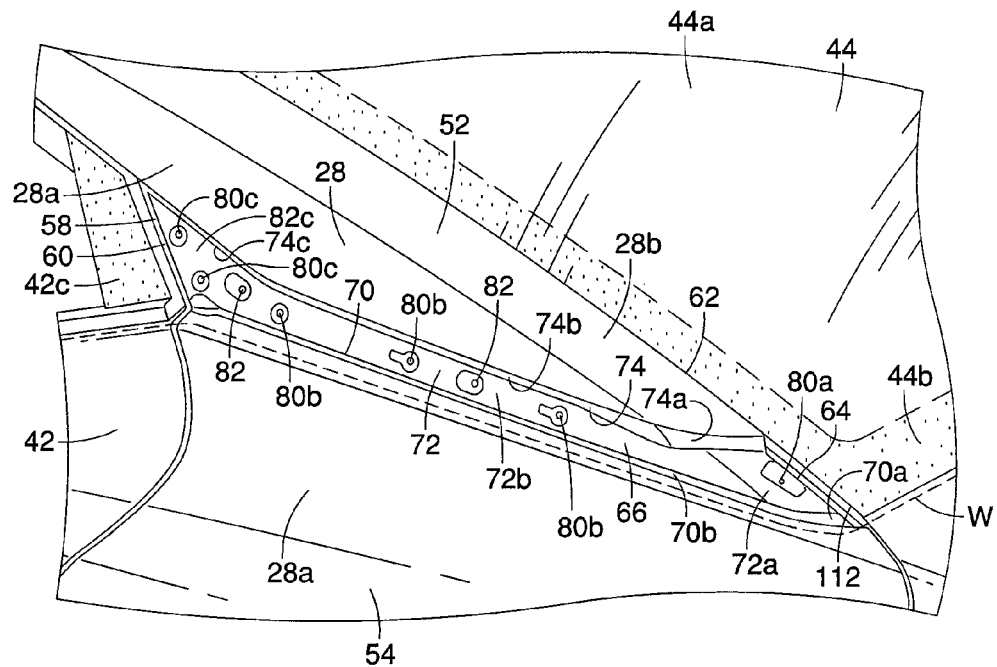
FIG. 9 is a perspective view of the rear pillar portion of the vehicle body structure showing the recess in accordance with the first embodiment.
Figure 11:
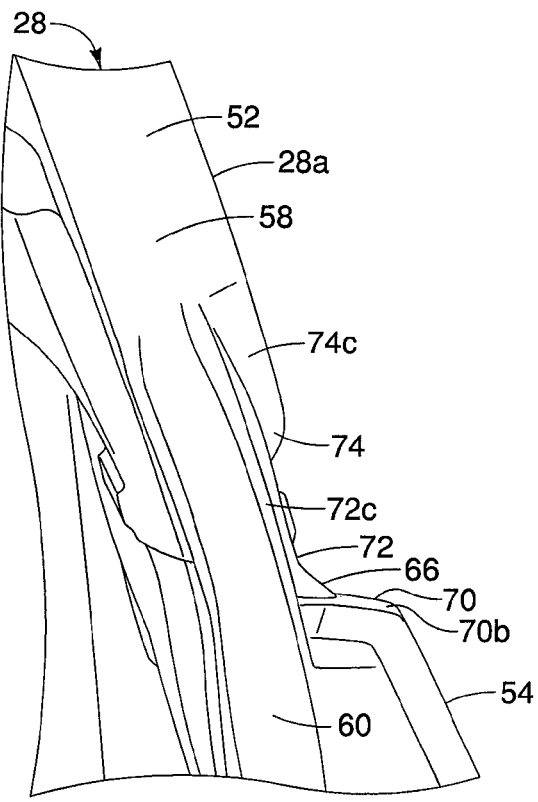
FIG. 11 is a front view of a portion of the rear door jamb of the rear door opening showing the recess in the rear pillar portion in accordance with the first embodiment.

As shown in FIGS. 8, 9 and 11, the recess 66 of the pillar portion 52 is defined by a plurality of contoured surfaces. Specifically, the recess 66 includes a lower surface 70, a main surface 72 and an upper surface 74. The lower surface 70 also includes a rear section 70a that curves in an inboard direction and extends to a bottom corner of the rear window opening 34, as shown in FIGS. 8 and 9. A side section 70b of the lower surface 70 basically faces upward and extends in a vehicle longitudinal direction D along the vehicle body waistline W from the rear section 70a to the forward peripheral end 58.

The main surface 72 also includes a rear section 72a, a side section 72b and a forward section 72c. The rear section 72a curves in an inboard direction from the side section 72b and extends to the rear window opening 34, as shown in FIGS. 8 and 9. The rear section 72a is wider than the side section 72b, as measured between the lower surface 70 and the upper surface 74. The rear section 72a is also inclined with respect to vertical by an angle α (FIG. 1) that is between 50 and 75 degrees. In the depicted embodiment, the rear section 72a includes portions that are inclined by an angle of approximately 70 degrees with respect to vertical.

The side section 72b extends in the vehicle longitudinal direction D along a majority of a lower area of the pillar portion 52 from the rear section 72a to the forward section 72c. The forward section 72c is wider in a vertical direction than the side section 72b such that at the door jamb 60, the lower surface 70 and the upper surface 74 are further apart from one another than at the side section 72b of the main surface 72 of the recess 66. More specifically, moving in a forward direction, the lower surface 70 and the upper surface 74 diverge, moving away from one another as they extend to the door jamb 60. The forward section 72c of the main surface 72 extends from the side section 72b to the door jamb 60.

The rear section 72a of the main surface 72 of the recess 66 includes an attachment aperture 80a. The side section 72b includes a plurality of attachment apertures 80b and an alignment aperture 82b. The forward section 72c of the recess 66 includes a pair of attachment apertures 80c and an alignment aperture 82c. The attachment aperture 80a, the attachment apertures 80b and the attachment apertures 80c constitute first attachment portions.

The upper surface 74 of the recess 66 includes a rear section 74a, a side section 74b and a forward section 74c. The rear section 74a curves in an inboard direction and extends from the side section 74b to the rear window opening 34 above the bottom corner of the rear window opening 34, but well below and spaced apart from an upper end of the rear window opening 34, as shown in FIGS. 8 and 9. The side section 74b of the upper surface 74 basically extends in the vehicle longitudinal direction D along the recess 66 from the rear section 74a to the forward section 74c. The forward section 74c extends slightly upward moving in the vehicle forward direction D from the side section 74b to the door jamb 60.

As shown in FIGS. 3-8, the rear window glass 44 includes a transparent section 44a and a non-transparent section 44b. The transparent section 44a is centrally located and provides full visibility therethrough. The transparent section 44a makes up the majority of the rear window glass 44. The non-transparent section 44b include a dark, light blocking material, such as a paint or tape fixed to an interior side of the rear window glass 44 along the peripheral edge thereof. The non-transparent section 44b serves any of a variety of purposes. First, the non-transparent section 44b covers, hides and/or obscures the sealing/adhesive material that fixedly attaches the rear window glass 44 to the lower window support member 38, the rear window supporting flanges 64 of each of the two rear body panels 28 and a window supporting flange 12a that extends into the rear window opening 34 from the roof structure 12. Second, since the non-transparent section 44b can be defined by a black, non-transparent (and optionally non-translucent) material, the non-transparent section 44b serves as a design feature of the vehicle 10. The exterior trim panel 14 is dimensioned to align and blend in with a lower area of the non-transparent section 44b along the vehicle body waistline W to provide the floating roof effect.

The roof structure 12 includes a plurality of panels (not shown). It should be understood from the drawings and the description herein that the roof rail portion 50 of the rear body panel 28 can cover a roof rail assembly of the roof structure 12 or can be an integral part of the roof rail assembly of the roof structure 12. Since roof rails and roof structures are conventional in nature, further description is omitted for the sake of brevity.

Figure 17:
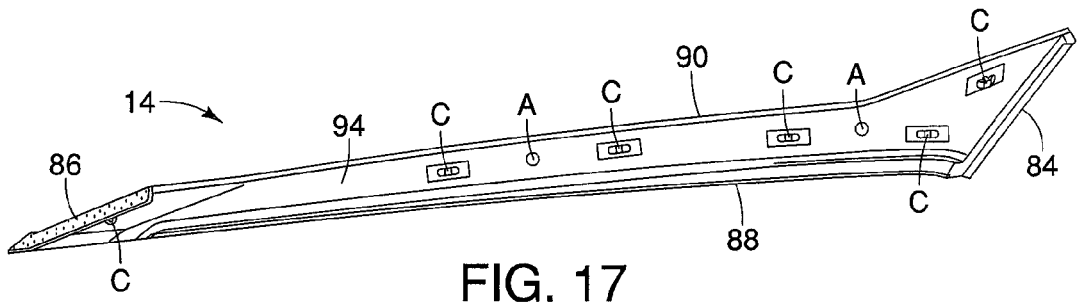
FIG. 17 is a side view of the exterior trim panel removed from the vehicle body structure showing a body facing surface thereof including the alignment pins and a plurality of clips that each include one of the snap fitting projections in accordance with the first embodiment.
Figure 18:
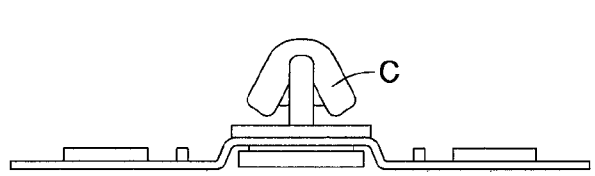
FIG. 18 is a side view of one of the clips removed from the exterior trim panel showing one of the snap fitting projections in accordance with the first embodiment.
Figure 19:
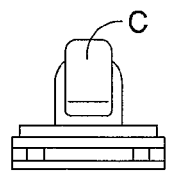
FIG. 19 is an end view of one of the clips showing the snap fitting projection in accordance with the first embodiment.

The exterior trim panel 14 is now described with specific reference to FIGS. 13-23. The exterior trim panel 14 includes a front end 84, a rear end 86, a lower edge 88, an upper edge 90 an outboard surface 92 and an inboard surface 94 (FIG. 17). The exterior trim panel 14 further includes a front section 96, a middle section 98 and a rear section 100. The exterior trim panel 14 also includes a chrome trim member 108, that is described in greater detail below In the depicted embodiment, the exterior trim panel 14 has a contoured shape with few straight lines. Specifically, the front section 96 is defined between diverging sections of the lower edge 88 and the upper edge 90. The front section 96 extends to the door jamb 60 with the exterior trim panel 14 installed to the recess 66 of the rear body panel 28. The front section 96 and the middle section 98 extend in the vehicle longitudinal direction D when installed to the recess 66, with the middle section 98 extending rearward from the front section 96 to the rear section 100. However, the rear section 100 curves from the middle section 98 in a lateral inboard direction I such that the rear section 100 extends to the rear window opening 34 with the exterior trim panel 14 installed to the recess 66 of the rear body panel 28. The rear section 100 is also contoured such that the rear section 100 is inclined with respect to vertical by the angle α, as indicated in FIG. 1. More specifically, the exterior trim panel 14 has surfaces and contours that are specifically configured to fit into and overlay the surfaces of the recess 66. Further, the middle section 98 generally extends in the vehicle longitudinal direction D, while the rear section 100 extends in the lateral inboard direction I, such that the rear section 100 is angularly offset from the vehicle longitudinal direction D by an angle of between 65 degrees and 90 degrees.

As indicated in FIG. 8, when the exterior trim panel 14 is installed in the recess 66, the front section 96 covers the forward section 72c of the main surface 72 of the recess 66. The middle section 98 covers the side section 72b of the main surface 72 of the recess 66, and the rear section 100 covers the rear section 72a of the main surface 72 of the recess 66.

Figure 12:
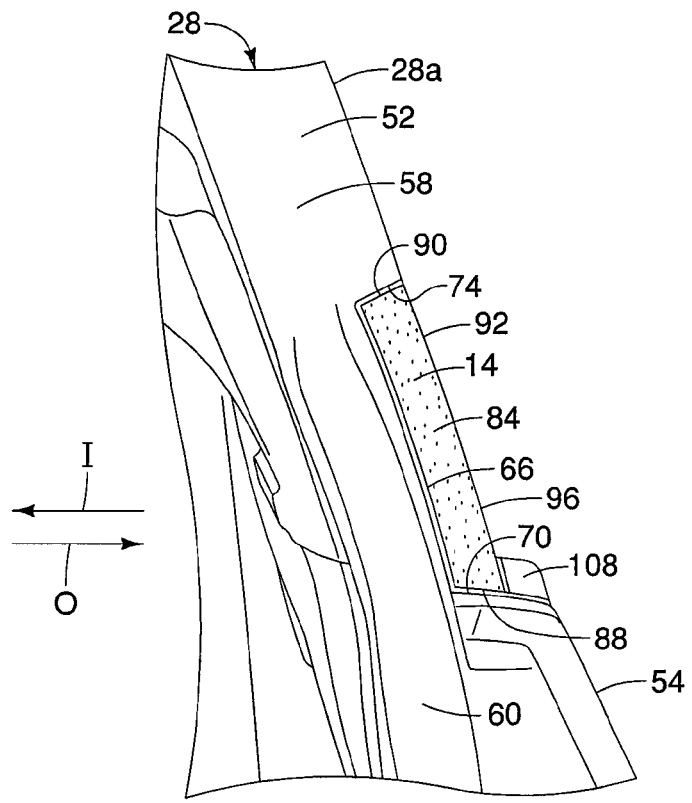
FIG. 12 is a front view of the portion of the door jamb of the rear door opening similar to FIG. 11 showing the recess in the rear pillar portion with the exterior trim panel installed in accordance with the first embodiment.

As shown in FIG. 12, when installed in the recess 66, the lower edge 88 overlays the lower surface 70 of the recess 66 and the upper edge 90 overlays the upper surface 74.

Figure 13:
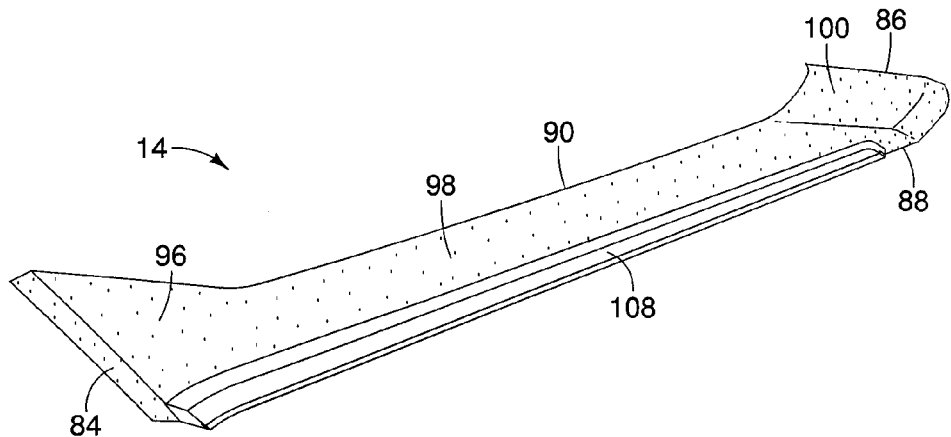
FIG. 13 is a perspective view of the exterior trim panel removed from the vehicle body structure showing an exterior surface and a front end thereof in accordance with the first embodiment.
Figure 14:
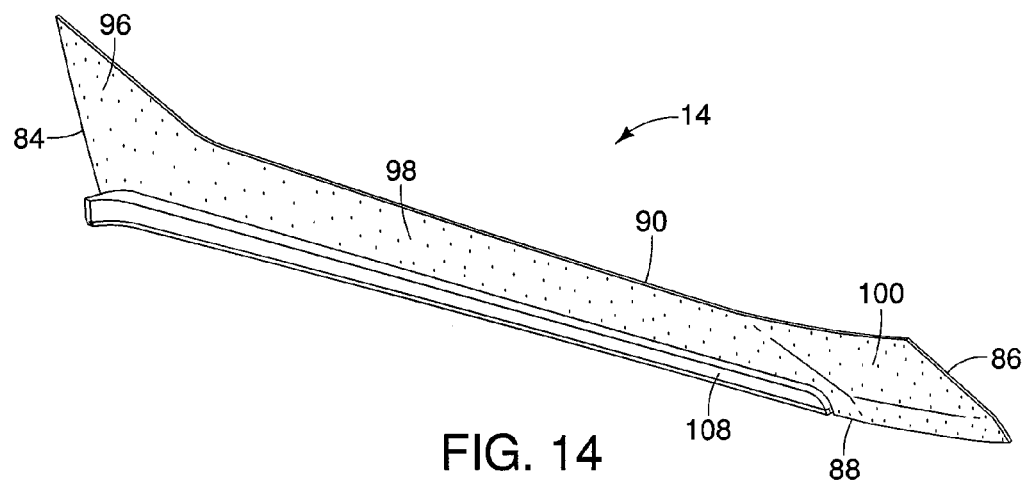
FIG. 14 is a perspective view of the exterior trim panel removed from the vehicle body structure showing the exterior surface and a rear end thereof in accordance with the first embodiment.
Figure 15:
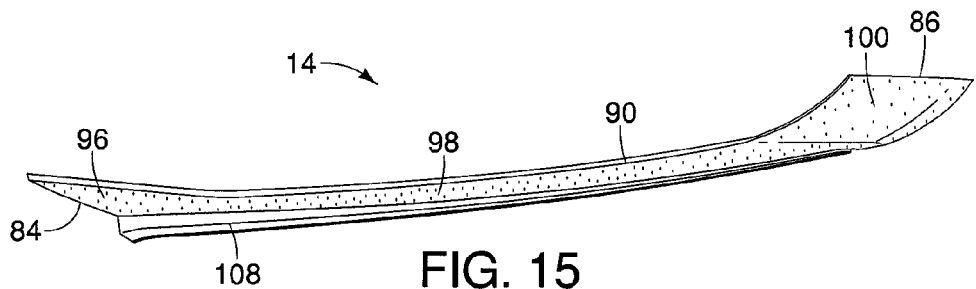
FIG. 15 is a top view of the exterior trim panel removed from the vehicle body structure in accordance with the first embodiment.
Figure 16:
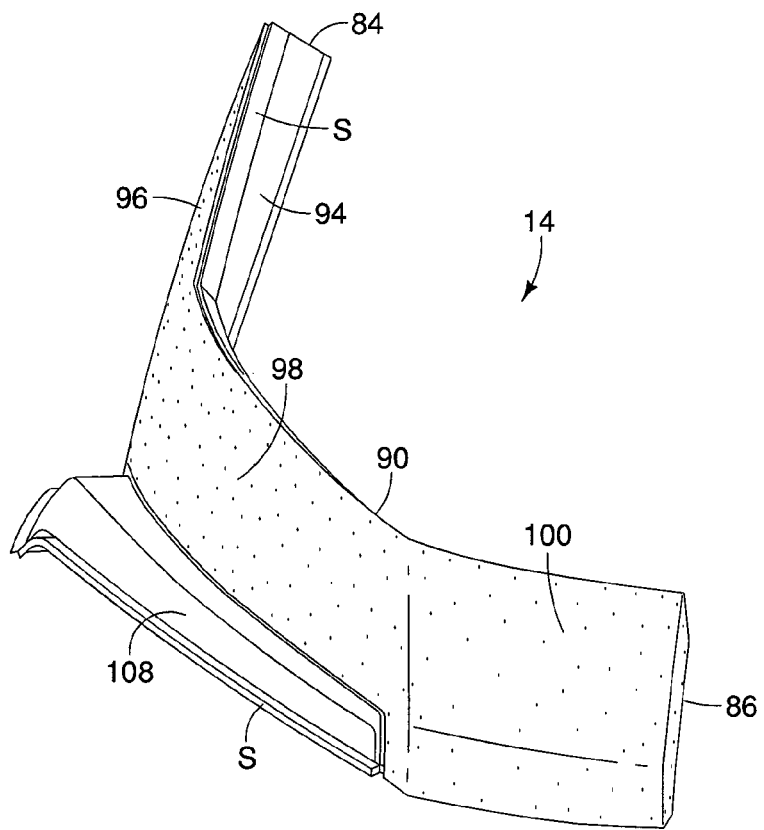
FIG. 16 is a rear view of the exterior trim panel removed from the vehicle body structure in accordance with the first embodiment.

As shown in FIG. 13, the front end 84 of the exterior trim panel 14 is generally flat and faces forward when installed to the recess 66. As shown in FIG. 12, when installed in the recess 66, the front end 84 is in approximate alignment with the door jamb 60 (the front peripheral edge section of the rear body panel 28).

Figure 4:
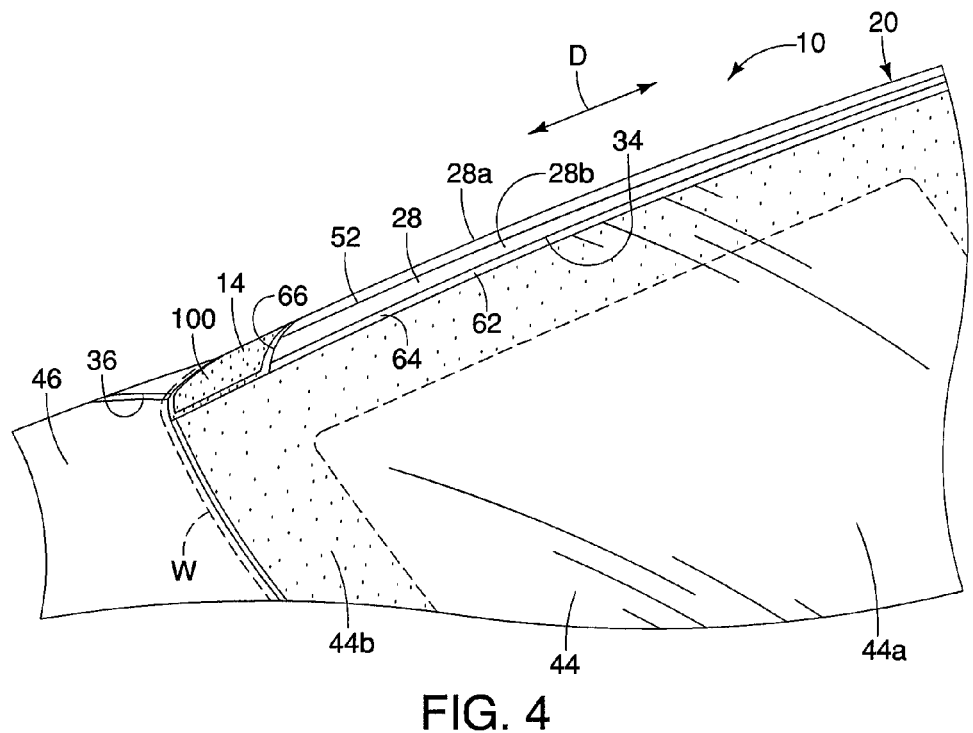
FIG. 4 is another perspective view of the rear portion of the vehicle, showing the exterior trim panel extending to the rear window in accordance with the first embodiment.
Figure 23:
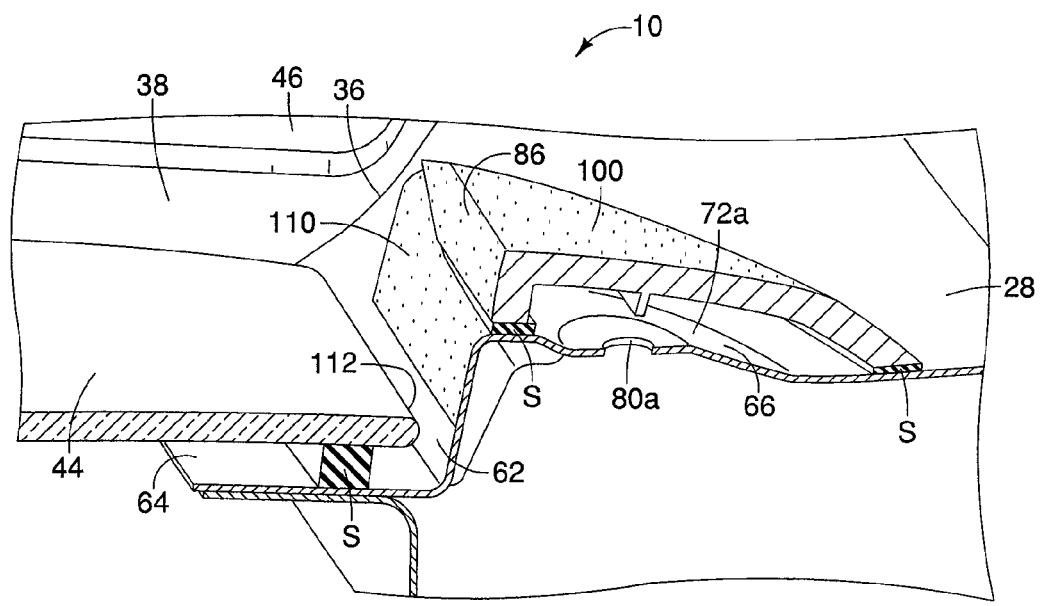
FIG. 23 is a cross-sectional view taken along the line 23-23 in FIG. 6 in accordance with the first embodiment.

As shown in FIGS. 4 and 23, the rear end 86 of the exterior trim panel 14 has a flat contour and aligns with the rearward peripheral end 62 of the pillar portion 52 of the rear body panel 28.

When installed to the recess 66, the lower edge 88 of the exterior trim panel 14 coincides with the vehicle body waistline W. In other words, a rear end of the lower edge 88 of the exterior trim panel 14 is in alignment with a lower edge of the rear window glass 44 and a front end of the lower edge 88 is in alignment with a lower edge of the non-transparent section 42b of the rearward side window 42a of the rear door 42.

Figure 10:
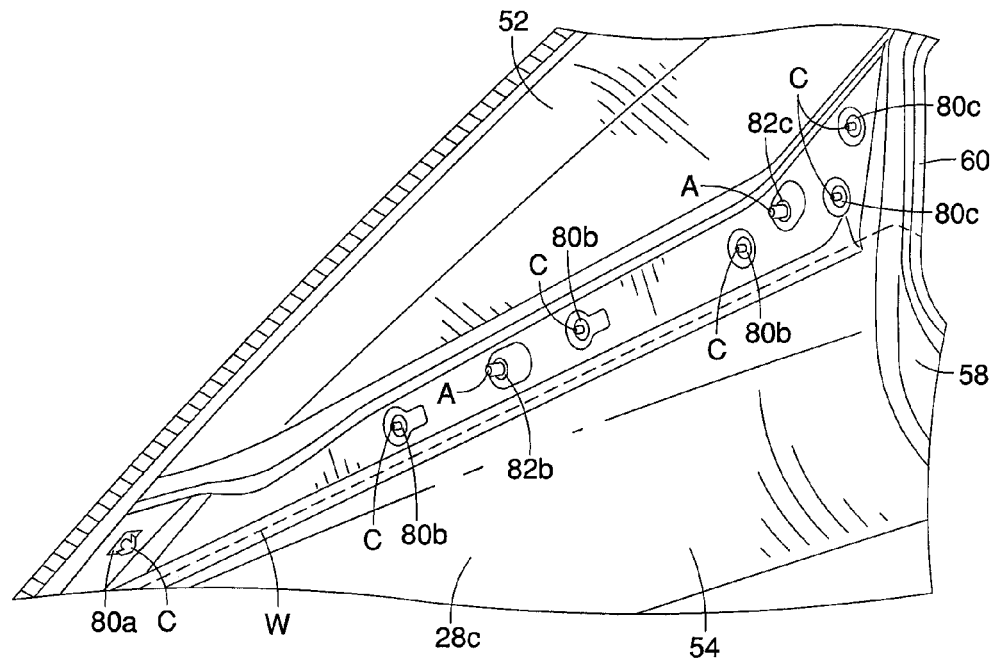
FIG. 10 is a perspective view of an inner surface of a panel that comprises the rear pillar portion of the vehicle body structure showing snap-fitting projections and alignment pins of the exterior trim panel extending through apertures in the rear pillar portion in accordance with the first embodiment.

As shown in FIG. 17, the inboard surface 94 of the exterior trim panel 14 is provided with a plurality of clips C and a pair of alignment pins A that constitute second attachment portions. The clips C are shown removed from the inboard surface 94 in FIGS. 18 and 19. The clips C attach to the inboard surface 94 in a conventional manner, for instance, by receiving attachment projections or sliding into groove portions formed on the inboard surface 94. The alignment pins A are rigidly fixed to or integrally formed with the inboard surface 94 in order to ensure proper positioning of the exterior trim panel 14 relative to the rear body panel 28. FIG. 10 is a view of the inboard surface 28c of the rear body panel 28 showing the attachment clips C extending through the attachment apertures 80a, 80b and 80c and the alignment pins A extending through the alignment apertures 82b and 82c.

Figure 20:
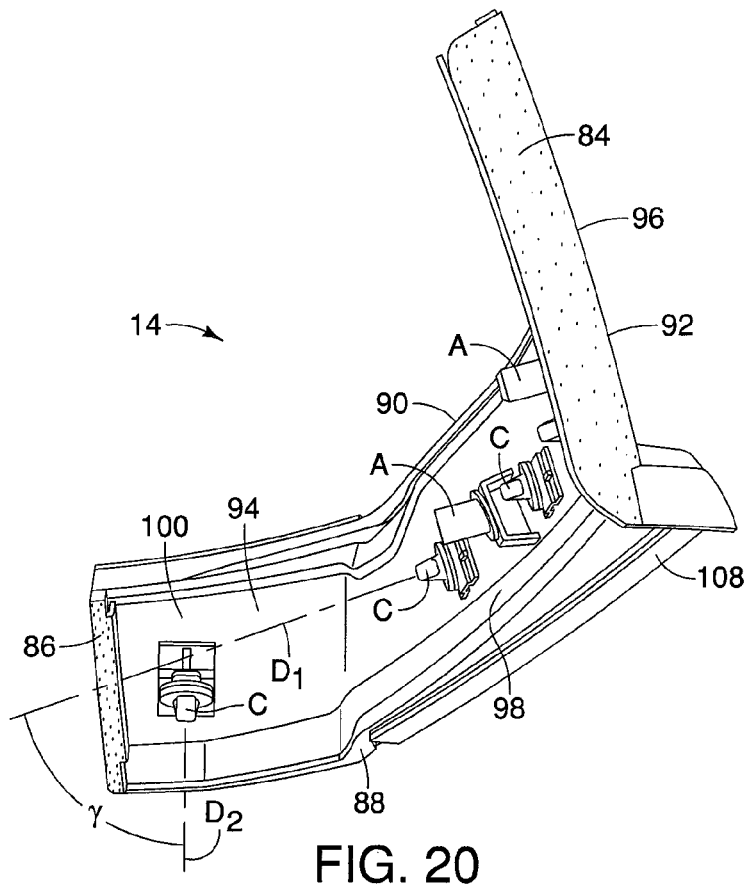
FIG. 20 is a front view of the exterior trim panel showing the front end and a portion of the body facing surface thereof in accordance with the first embodiment.

In FIG. 20, two of the clips C attached to the inboard surface 94 at the middle section 98 of the exterior trim panel 14 are visible and also extend parallel to one another. Further, the snap-fitting projections of those two clips C are parallel to one another, with the rearmost one of the clips C extending in a first direction $D_1$, as shown in FIG. 20. The rear section 100 is angularly offset about vertical axis and angularly inclined with respect to vertical, and relative to the middle section 98 of the exterior trim panel 14, as is described above. The snap-fitting projection of the clip C installed to the rear section 100 of the exterior trim panel 14 is also angularly offset and angularly inclined with respect to the clips C on the middle section 98. Specifically, the clip C installed to the rear section 100 extends in a second direction $D_2$ that is angularly offset from the first direction $D_1$. More specifically, the first direction $D_1$ and the second direction $D_2$ are offset from one another by an angle γ that is between 65 and 85 degrees. In the depicted embodiment, the angle γ is 71 degrees.

Figure 21:
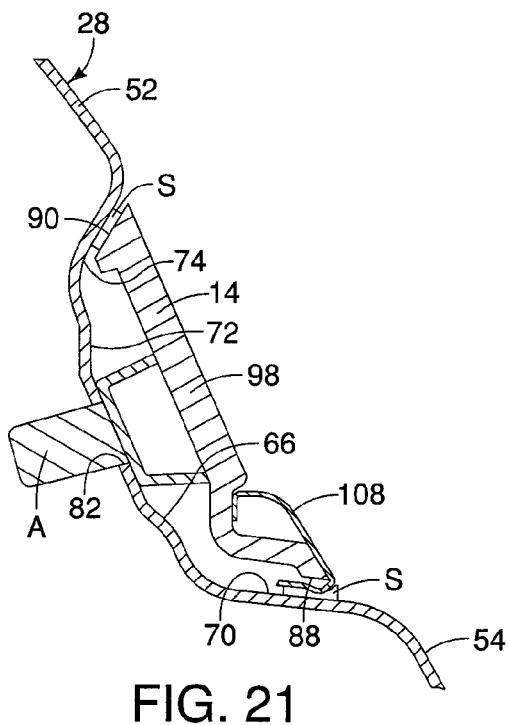
FIG. 21 is a cross-sectional view taken along the line 21-21 in FIG. 5 in accordance with the first embodiment.
Figure 22:
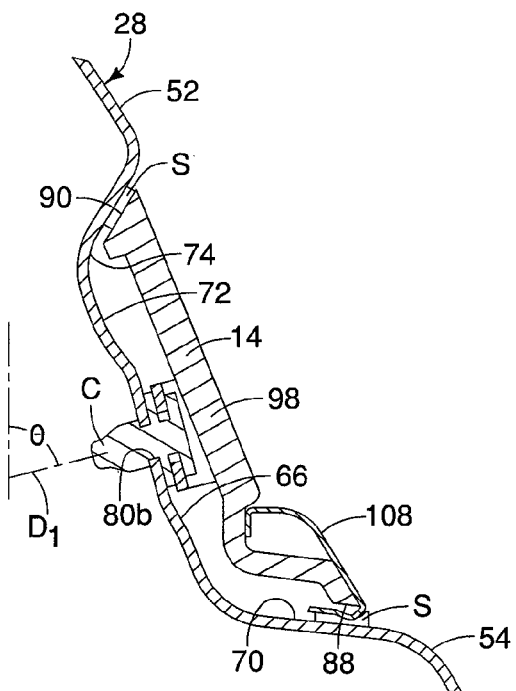
FIG. 22 is a cross-sectional view taken along the line 22-22 in FIG. 5 in accordance with the first embodiment.

As shown in the cross-section in FIG. 21, one of the alignment pins A extends through alignment apertures A, and in FIG. 22, the snap-fitting projection of one of the clips C extends through the aperture 80b. As also shown in FIG. 22, the direction $D_1$ is inclined with respect to vertical by an angle θ of between 60 and 80 degrees. The direction $D_2$ is inclined with respect to vertical by an angle that is equal to the angle α plus 90 degrees (the angle α is discussed above and shown in FIG. 1).

As is shown in FIGS. 21 and 22, when the exterior trim panel 14 is installed to the recess 66, sealing members S are used to reduce noise and water infiltration. More specifically, the sealing member S is located between the lower surface 70 of the recess 66 and the lower edge 88 of the exterior trim panel 14. Further, another one of the sealing member S is located between the upper surface 74 of the recess 66 and the upper edge 90 of the exterior trim panel 14. Hence, the exterior trim panel 15 is provided with the sealing members S (seals) that are positioned to contact the outboard surface 28a (an outboard facing surface) and the rearward facing surface 28b of the rear body panel 28, but are located within the recess 66.

The chrome trim member 108 attaches to the lower edge 88 of the exterior trim panel 14 providing a cosmetic accent to the overall appearance of the exterior trim panel 14. As shown in FIG. 12, the chrome trim member 108 has a closed end that aligns with the surface of the door jamb 60. Similarly, the front end 84 of the exterior trim panel 14 is closed aligning with the surface of the door jamb 60.

As shown in FIGS. 13-16, the chrome trim member 108 extends rearward from the front end 84 of the exterior trim panel 14 along the front section 96 and the middle section 98. However, in the depicted embodiment, the chrome trim member 108 ends just forward of the rear section 100 of the exterior trim panel 14. However, it should be understood from the drawings and the description herein that the chrome trim member 108 can be provided with a greater length in the vehicle longitudinal direction or can be completely eliminated. The inclusion and possible elimination of the chrome trim member 108 is a matter of cosmetic preference.

As shown in FIG. 12, the outboard facing surface 92 of the exterior trim panel 14 is flush with an adjacent section of the outboard facing surface 28a of the pillar portion 52 (above the recess 66). Further, as is also shown in FIG. 12 which shows an inboard direction I and an outboard direction O, the fender portion 54 (a lower section of the rear body panel 28) extends further outboard relative to the outboard surface 92 of the exterior trim panel 14.

In FIG. 5, relative dimensions of the exterior trim panel are identified. Specifically, an overall length $L_1$ of the exterior trim panel 14 as measured along the vehicle body waistline W is shown. A first height $L_2$ of the exterior trim panel 14 is measured adjacent to the rear end 86 of the exterior trim panel 14. Further, a maximum height $L_3$ is measured in a vertical direction at the front end 84 of the exterior trim panel 14. As is clearly shown in FIG. 5, the overall length is several times greater than either of the first height $L_2$ or the maximum height $L_3$. Further, the overall length $L_1$ of the exterior trim panel 14 more than five times the maximum height $L_3$, and more than nine times the first height $L_2$ in the depicted embodiment. However, it should be understood from the drawings and description herein that the ratios between the overall length $L_1$, the first height $L_2$, the maximum height $L_3$ of the exterior trim panel 14 can be adjusted and altered. However, in the depicted embodiments, the overall length $L_1$ of the exterior trim panel 14 is greater than the first height $L_2$ and greater than the maximum height $L_3$.

As shown in FIGS. 6 and 23, the rear end section 100 of the exterior trim panel 14 includes the rear end 86. The rear end 86 closes the inboard end of the exterior trim panel 14 while installed to the pillar portion 52 of the rear body panel 28. Further, an exposed outboard facing surface 112 of the rear window glass 44 faces the rear end 86 (the closed inboard end of the exterior trim panel 14).

The rear window glass 44 is installed to the rear window opening 34 in the absence of surrounding trim. In other words, at least the lateral edges, including the outboard facing surface 112, are exposed and or visible. Further, as mentioned above, the rear window glass 44 is provide with the non-transparent section 44b, which is darkened or black. Further the exterior trim panels 14 are darkened or black in appearance. In design configurations, such as those shown in FIGS. 6 and 23, there is a gap between the outboard facing surface 112 of the rear window glass 44 and the rear end 86 of the exterior trim panel 14. Therefore, as shown in FIGS. 6 and 23, a dark or black material 110 is provided on specific portions of a surface of rearward peripheral end 62 and the rear window supporting flange 64 of the pillar portion 52 of the rear body panel 28. The material 110 is dimensioned to align with the non-transparent section 44b of the rear window glass 44 and the rear section 100 of the exterior trim panel 14. In other words, the material 110 blackens space between the rear section 100 of the exterior trim panel 14 and the non-transparent section 44b (the black section) of the rear window glass 44. The material 110 can be a black tape or a black paint.

The black or dark lower portion of the non-transparent section 44b of the rear window glass 44, the black or dark material 110, the black or dark exterior trim panel 14, the black or dark non-transparent section 42c of the rear door 42, the black or dark trim panels covering the B-pillar 24 and the black or dark exterior surface of the A-pillars 22, along with the windshield of the vehicle 10 provide the roof structure 12 with a floating appearance. Under most lighting conditions, the lower portion of the non-transparent section 44b, the material 110, the exterior trim panels 14, the A-pillar 22, the B-pillar 24 and the non-transparent section 42c in the depicted embodiment are black, and appear to disappear making the roof structure 12 look as if it were separated from the remainder of the vehicle 10.

It should be understood from the drawings and the description herein that the vehicle 10, including the roof structure 12, the front door 40, the rear door 42, the trunk lid 46 and the fender portion 54 of the vehicle 10 are provided with a first exterior color while the lower portion of the non-transparent section 44b, the material 110, the exterior trim panel 14 and the non-transparent section 42c are all provided with generally the same dark second exterior color (for example, black), with the second exterior color being darker than the first exterior color. Consequently, the lower portion of the non-transparent section 44b, the material 110, the exterior trim panel 14 and the non-transparent section 42c define a uniform and dark colored stripe along an upper edge of the waistline W. This dark colored stripe provides the vehicle 10 with a floating roof appearance.

In the depicted first embodiment, the front section 96, the middle section 98 and the rear section 100 of the exterior trim panel 14 are formed as a continuous and single monolithic element, with no breaks or seams. In the first embodiment, the chrome trim member 108 is a separate element, but is provided as an accent and does not affect the floating roof appearance that is in part provided by the dark or black color of the outboard surface 92 of the exterior trim panel 14.

It should be understood from the drawings and the description herein that the vehicle 10 can include any of a variety of chrome trim elements that align with the chrome trim member 108. More specifically, the front door 40 and the rear door 42 can include chrome trim elements at the bottom of the forward side window 40a and the rearward side window 42a that combined with the chrome trim member 108, define a continuous chrome trim line that extends along the side of the vehicle 10, aligned with the vehicle body waistline W.

Second Embodiment

Figure 24:
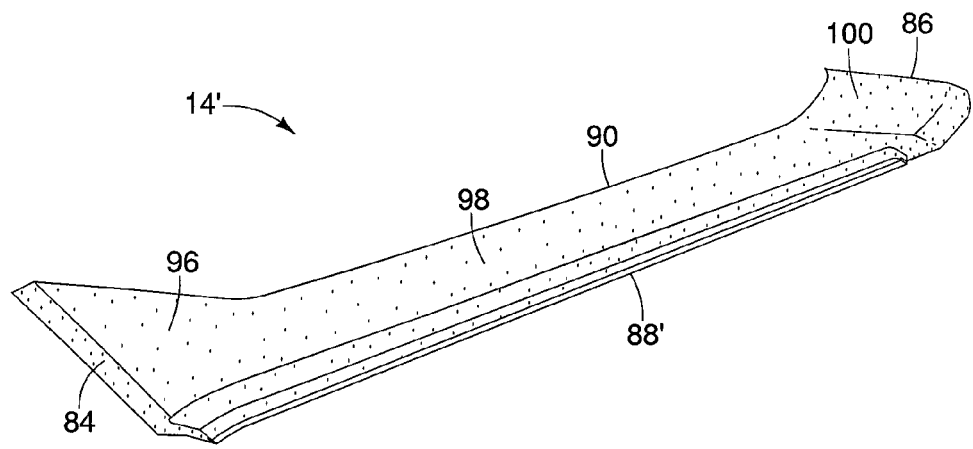
FIG. 24 is a perspective view similar to FIG. 13 of an exterior trim panel that is a one-piece, unitary monolithic element, showing an exterior surface and a front end thereof in accordance with a second embodiment.
Figure 25:
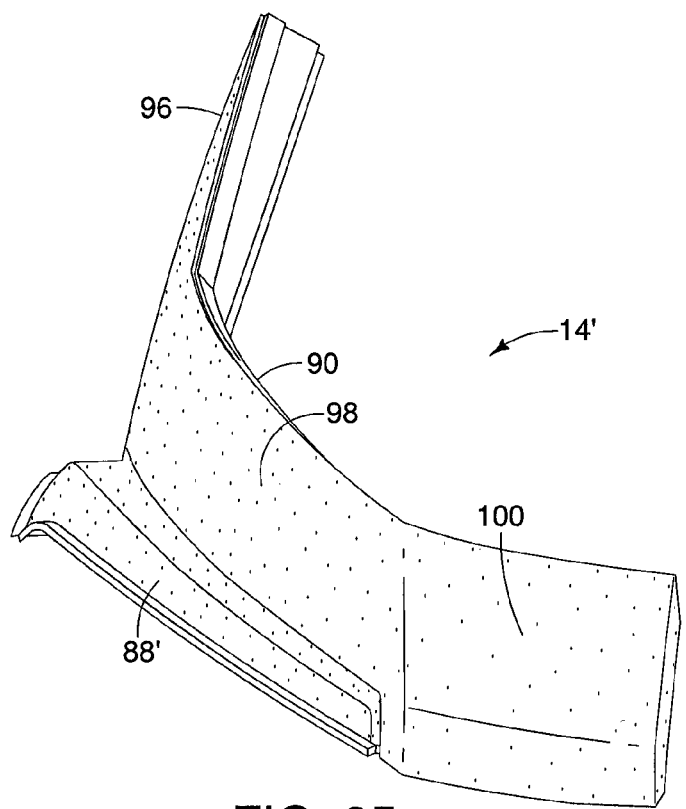
FIG. 25 is a rear view of the exterior trim panel shown in FIG. 24 in accordance with the second embodiment.
Figure 26:
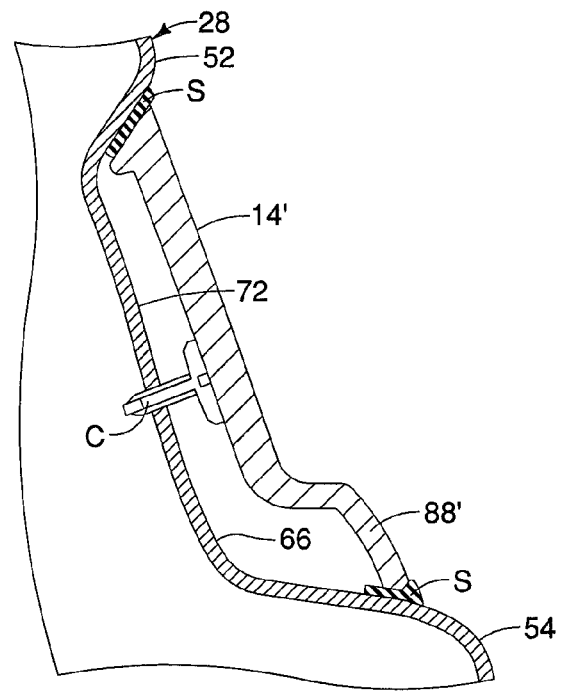
FIG. 26 is a cross-sectional similar to FIG. 22 showing the exterior trim panel installed to the pillar structure of the vehicle in accordance with the second embodiment.

Referring now to FIGS. 24, 25 and 26, an exterior trim panel 14' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the exterior trim panel 14' includes the upper edge 90, the front section 96, the middle section 98 and the rear section 100 as described above with respect to the first embodiment. However, in the second embodiment, the lower edge 88 of the first embodiment is modified such that a lower edge 88' is included that omits the chrome trim member 108. In other words, there is no chrome trim member 108 in the second embodiment. Rather, the lower edge 88' has the overall shape of the chrome trim member 108 of the first embodiment, but without any chrome being present. However, in a modification to the second embodiment, the lower edge 88' can be separately painted to provide a chrome finish, while maintaining the exterior trim panel 14' as a single, unitary monolithic element, rather than the two separate elements described above with respect to the exterior trim panel 14 and the chrome trim member 108 of the first embodiment.

Third Embodiment

Figure 27:
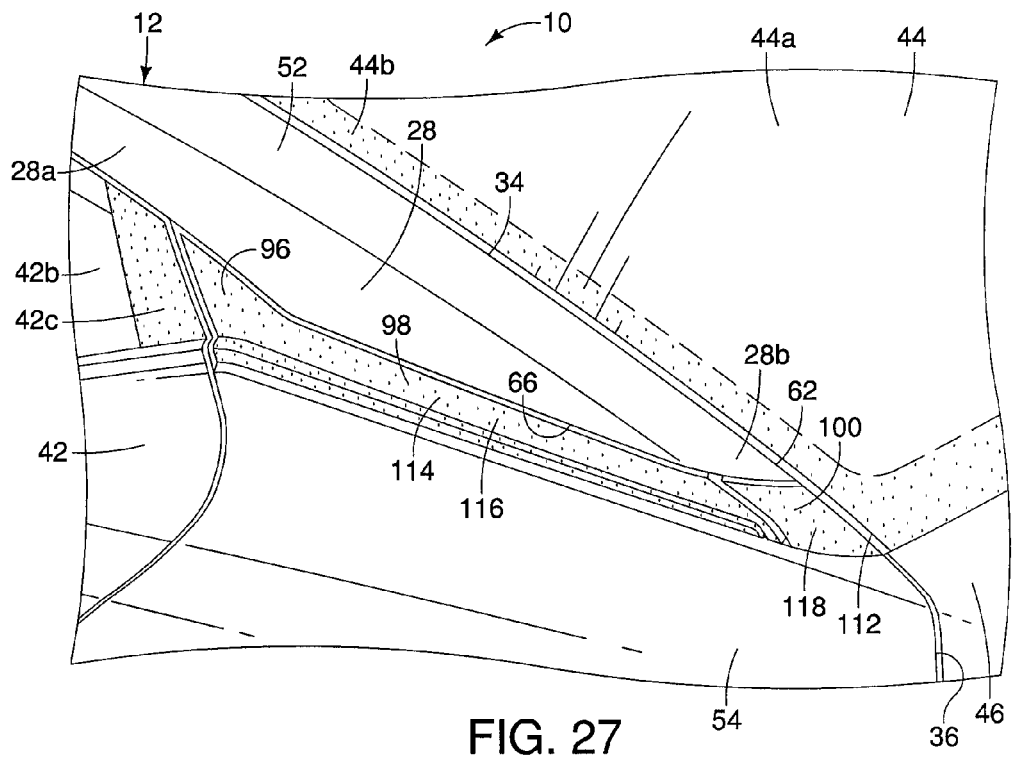
FIG. 27 is a perspective view similar to FIG. 5 showing an exterior trim panel that has a two-piece construction installed to the pillar structure of the vehicle in accordance with a third embodiment.
Figure 28:
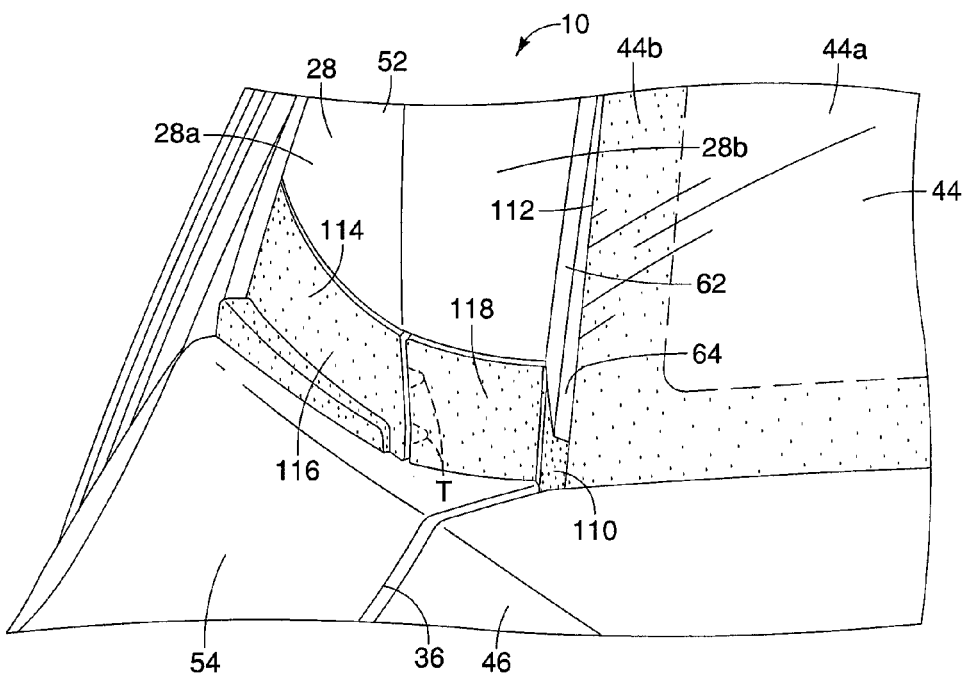
FIG. 28 is a rear view of the exterior trim panel shown in FIG. 27 in accordance with the third embodiment.

Referring now to FIGS. 27 and 28, the vehicle 10 is depicted with an exterior trim panel assembly 114 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the vehicle 10 includes the rear body panel 28, as described above with respect to the first embodiment. However, in the third embodiment the exterior trim panel 14 of the first embodiment is replaced with the exterior trim panel assembly 114.

As shown in FIGS. 27 and 28, the exterior trim panel assembly 114 includes a first section 116 and a second section 118. The first section 116 and the second section 118 are separate elements that are attached to one another during a manufacturing process. The first section 116 includes all of the features of the front section 96 and the middle section 98 of the first embodiment. In the third embodiment, the second section 118 has all of the features of the rear section 100 as described above with respect to the first embodiment.

In the third embodiment, the first section 116 can include a pair of tongue elements T that extend into slots (not shown) of the second section 118, attaching the first section 116 to the second section 118. The arrangements and locations of the clips C and alignment pins A of the first embodiment remain the same in the third embodiment with respect to the front section 96, the middle section 98 and the rear section 100, as described above with respect to the first embodiment. Therefore, further description is omitted for the sake of brevity.

Fourth Embodiment

Figure 29:
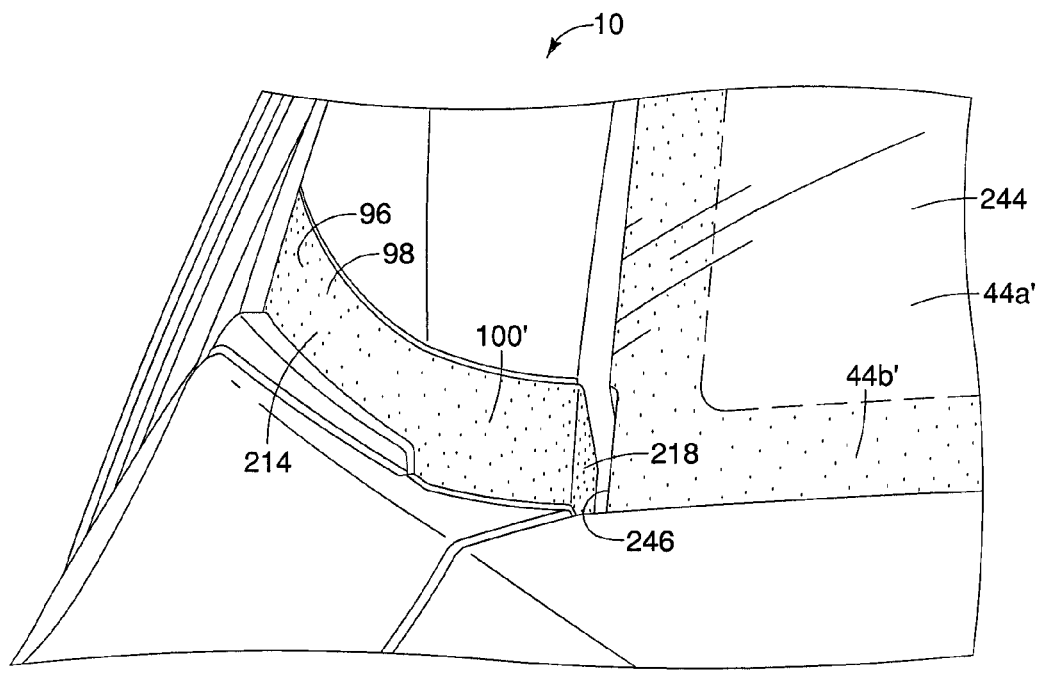
FIG. 29 is a rear view of a rear portion of the vehicle showing an exterior trim panel extending to the rear window in accordance with a fourth embodiment.
Figure 30:
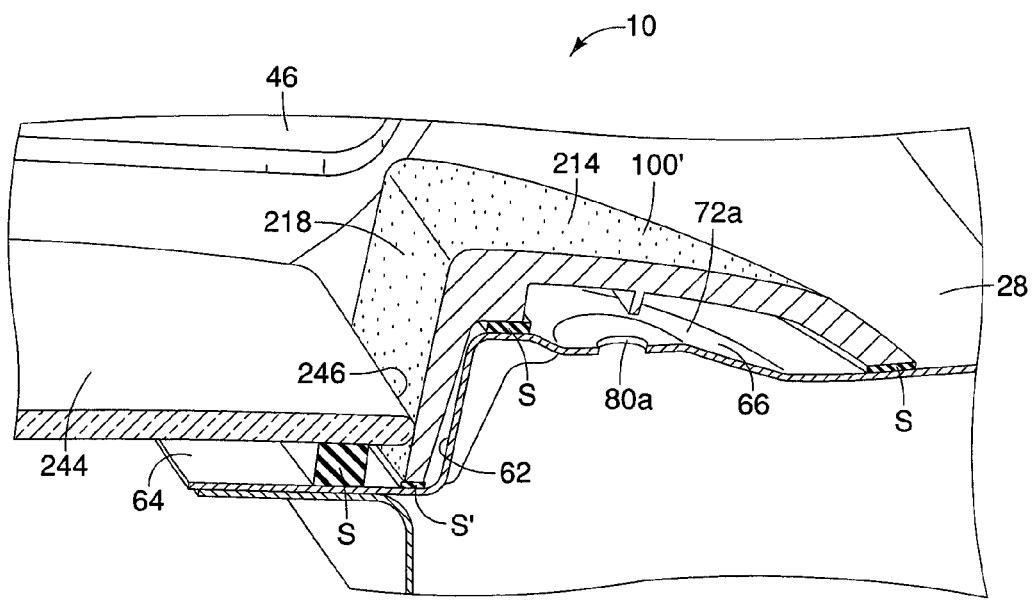
FIG. 30 is a cross-sectional view similar to FIG. 23, showing the exterior trim panel depicted in FIG. 29 including a rear end portion with an extension or flange that extends beyond an inner edge of a rear window of the vehicle in accordance with a fourth embodiment.

Referring now to FIGS. 29 and 30, the vehicle 10 having an exterior trim panel 214 and a rear window 244 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The rear body panel 28 of the vehicle 10 in the fourth embodiment is unchanged compared to the first embodiment. In the fourth embodiment, the exterior trim panel 14 is replaced with an exterior trim panel 214 and the rear window glass 44 is replaced with a rear window glass 244 that includes a transparent section $44a'$ and a non-transparent section $44b'$. The rear window glass 244 is identical to the rear window glass 44 except that a notch 246 is formed at lower outboard edges thereof, as shown in FIG. 29. The notch 246 is provided to accommodate a feature of the exterior trim panel 214. The notch 246 has a width measured along a lateral edge of the rear window glass 244 that is approximately the same width as a non-transparent section $44b'$ of the rear window glass 244. The notch 246 can be an optional feature.

The exterior trim panel 214 includes the front section 96 and the middle section 98 as described above with respect to the exterior trim panel 14 of the first embodiment. The exterior trim panel 214 also includes a rear section $100'$ that includes all of the features of the rear section 100 of the first embodiment, except that the rear end 86 of the first embodiment has been extended to form a flange 218. The flange 218 extends downward into a space defined between the rearward peripheral end 62 of the pillar portion 52 of the rear body panel 28 and the notch 246 of the rear window glass 244, and above the rear window supporting flange 64. Further, the flange 218 is provided with a seal S' that is compressed between a bottom edge of the flange 218 and the rear window supporting flange 64.

As shown in FIG. 30, there is no need for the black material 110 described above with respect to the first embodiment. In other words, in the fourth embodiment, the black material 110 can be omitted.

Fifth Embodiment

Figure 31:
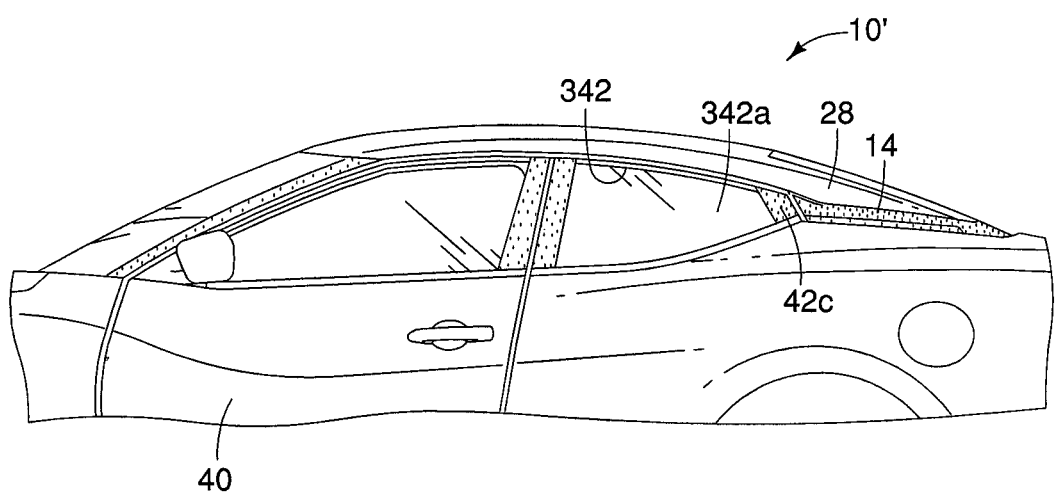
FIG. 31 is a side view of a vehicle that includes a rear side window with the exterior trim panel extending from the rear side window to the rear window in accordance with a fifth embodiment.

Referring now to FIG. 31, a vehicle 10' having the exterior trim panel 14 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the vehicle 10' is a two door coupe, with only one door per side. More specifically, the vehicle 10' includes the rear body panel 28 and the exterior trim panel 14, but does not include the rear door 42. Instead, the rear door opening 32 (a side opening) of the first embodiment is replaced with a rear fender portion extension and a side window opening 342. A rearward side window 342a is installed to the side window opening 342. The rearward side window 342a includes the non-transparent section 42c described above with respect to the first embodiment.

As in the first embodiment, the non-transparent section 42c and the exterior trim element 14 provide the roof structure 12 with a floating roof appearance.

The body features of the vehicle 10 and vehicle body structure 20 include may conventional components that are well known in the art. Since these conventional components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, and including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
   a rear body panel having a pillar portion extending upward from a vehicle body waistline defined along the rear body panel, the pillar portion including an outboard facing surface and a rearward facing surface, the outboard facing surface having a front peripheral edge section at least partially defining a side opening, the rearward facing surface having an inboard peripheral edge section at least partially defining a rear window opening, the pillar portion of the rear body panel including a recess formed along the outboard facing surface and the rearward facing surface adjacent to the vehicle body waistline;
   a rear window glass installed within the rear window opening overlaying at least a portion of the inboard peripheral edge section; and
   an exterior trim panel having a first section extending rearward from the front peripheral edge section along the outboard facing surface at the vehicle body waistline and a second section that extends in a lateral inboard direction from a rearward end of the first section to the inboard peripheral edge section along the rearward facing surface to the rear window opening at the vehicle body waistline, the exterior trim panel being at least partially disposed within the recess.

2. The vehicle body structure according to claim 1, wherein the recess extends along the outboard facing surface and the rearward facing surface from the side opening to the rear window opening.

3. The vehicle body structure according to claim 2, wherein the exterior trim panel is provided with seals positioned to contact the outboard facing surface and the rearward facing surface within the recess.

4. The vehicle body structure according to claim 1, wherein the exterior trim panel includes an outboard surface that is flush with an adjacent section of the outboard facing surface of the pillar portion above the recess, and
   a lower section of the outboard facing surface of the rear body panel below the vehicle body waistline extends further outboard relative to the outboard surface of the exterior trim panel.

5. The vehicle body structure according to claim 1, wherein the outboard facing surface and the rearward facing surface adjacent to the vehicle body waistline include first attachment portions, and
   the first section and the second section of the exterior trim panel include second attachment portions that attach to respective ones of the first attachment portions.

6. The vehicle body structure according to claim 5, wherein the first attachment portions include first apertures formed in the outboard facing surface and a second aperture formed in the rearward facing surface, and
   the second attachment portions include first snap-fitting projections installed to the first section and a second snap-fitting projection installed to the second section.

7. The vehicle body structure according to claim 6, wherein at least two of the first snap-fitting projections extend in first directions that are parallel to one another, and
   the second snap-fitting projection extends in a direction that is angularly offset from the first directions.

8. The vehicle body structure according to claim 5, wherein the first section of the exterior trim panel includes a plurality of alignment pins located at spaced apart locations proximate the first attachment portions, and
   the outboard facing surface includes alignment apertures that receive respective ones of the plurality of alignment pins.

9. The vehicle body structure according to claim 1, wherein the second section of the exterior trim panel has a closed inboard end while installed to the pillar portion of the rear body panel, and
   the rear window glass has an exposed outboard surface facing the closed inboard end of the second section of the exterior trim panel.

10. The vehicle body structure according to claim 1, wherein
    the rearward facing surface of the rear body panel has a rear window flange extending inboard from the inboard peripheral edge section, and
    a closed inboard end of the exterior trim panel has a flange extending along a portion of the inboard peripheral edge section toward the rear window flange.

11. The vehicle body structure according to claim 1, wherein
    the rear body panel is provided with a first exterior color, and
    the exterior trim panel is provided with a second exterior color that is darker than the first exterior color.

12. The vehicle body structure according to claim 11, wherein
    a lower edge portion of the rear window glass is provided with the second exterior color along one surface thereof, and
    a portion of the inboard peripheral edge section of the rearward facing surface adjacent to the second section of the exterior trim panel is provided with the second exterior color such that the exterior trim panel, the lower edge portion of the rear window glass, the portion of the inboard peripheral edge section and the exterior trim panel define a uniform colored stripe.

13. The vehicle body structure according to claim 1, wherein
    the exterior trim panel is provided with seals positioned to contact the outboard facing surface and the rearward facing surface.

14. The vehicle body structure according to claim 1, wherein
    the first section extends in a vehicle longitudinal direction and the second section of the exterior trim panel extends in the lateral inboard direction such that the lateral inboard direction is angularly offset from the vehicle longitudinal direction by an angle of between 65 degrees and 90 degrees.

15. The vehicle body structure according to claim 1, wherein
the exterior trim panel has an overall length measured along the vehicle body waistline, and the exterior trim panel has a maximum height measured in a vertical direction, with the overall length being greater than the maximum height.

16. The vehicle body structure according to claim 1, wherein
the side opening is a side window receiving opening with a side window being installed therein, with the vehicle body waistline extending along a lower edge of the side window receiving opening.

17. The vehicle body structure according to claim 1, wherein
the side opening is a door receiving opening with a door being coupled for movement between an open position and closed position relative to the rear outer body panel, a rearward edge of the door being located adjacent to a forward edge of the exterior trim panel with the door in the closed position.

18. The vehicle body structure according to claim 1, wherein
the first section and the second section of the exterior trim panel are formed as a continuous and single monolithic element.

19. The vehicle body structure according to claim 1, wherein
the first section and the second section of the exterior trim panel are separate elements mechanically attached to one another.

20. A vehicle body structure comprising:
a rear body panel having a pillar portion extending upward from a vehicle body waistline defined along the rear body panel, the pillar portion including an outboard facing surface and a rearward facing surface, the outboard facing surface having a front peripheral edge section at least partially defining a side opening, the rearward facing surface having an inboard peripheral edge section at least partially defining a rear window opening;
a rear window glass installed within the rear window opening overlaying at least a portion of the inboard peripheral edge section; and
an exterior trim panel having a first section extending rearward from the front peripheral edge section along the outboard facing surface at the vehicle body waistline and a second section that extends in a lateral inboard direction from a rearward end of the first section to the inboard peripheral edge section along the rearward facing surface to the rear window opening at the vehicle body waistline, the second section of the exterior trim panel having a closed inboard end while installed to the pillar portion of the rear body panel, and the rear window glass having an exposed outboard surface facing the closed inboard end of the second section of the exterior trim panel.

21. A vehicle body structure comprising:
a rear body panel having a pillar portion extending upward from a vehicle body waistline defined along the rear body panel, the pillar portion including an outboard facing surface and a rearward facing surface, the outboard facing surface having a front peripheral edge section at least partially defining a side opening, the rearward facing surface having an inboard peripheral edge section at least partially defining a rear window opening, the rear body panel being provided with a first exterior color;
a rear window glass installed within the rear window opening overlaying at least a portion of the inboard peripheral edge section; and
an exterior trim panel having a first section extending rearward from the front peripheral edge section along the outboard facing surface at the vehicle body waistline and a second section that extends in a lateral inboard direction from a rearward end of the first section to the inboard peripheral edge section along the rearward facing surface to the rear window opening at the vehicle body waistline, the exterior trim panel being provided with a second exterior color that is darker than the first exterior color.

22. A vehicle body structure comprising:
a rear body panel having a pillar portion extending upward from a vehicle body waistline defined along the rear body panel, the pillar portion including an outboard facing surface and a rearward facing surface, the outboard facing surface having a front peripheral edge section at least partially defining a door receiving opening with a door being coupled for movement between an open position and a closed position relative to the rear outer body panel, the rearward facing surface having an inboard peripheral edge section at least partially defining a rear window opening;
a rear window glass installed within the rear window opening overlaying at least a portion of the inboard peripheral edge section; and
an exterior trim panel having a first section extending rearward from the front peripheral edge section along the outboard facing surface at the vehicle body waistline and a second section that extends in a lateral inboard direction from a rearward end of the first section to the inboard peripheral edge section along the rearward facing surface to the rear window opening at the vehicle body waistline, with a rearward edge of the door being located adjacent to a forward edge of the exterior trim panel with the door in the closed position.

* * * * *